US008055638B2

(12) United States Patent
Schechter et al.

(10) Patent No.: US 8,055,638 B2
(45) Date of Patent: Nov. 8, 2011

(54) PROVIDING RECENT HISTORY WITH SEARCH RESULTS

(75) Inventors: Michael Austin Schechter, Sammamish, WA (US); Michael Gradek, New York, NY (US)

(73) Assignee: Microsoft Corporation, Redmond, WA (US)

( * ) Notice: Subject to any disclaimer, the term of this patent is extended or adjusted under 35 U.S.C. 154(b) by 383 days.

(21) Appl. No.: 12/332,996

(22) Filed: Dec. 11, 2008

(65) Prior Publication Data

US 2010/0153427 A1    Jun. 17, 2010

(51) Int. Cl.
*G06F 7/00* (2006.01)
*G06F 17/30* (2006.01)

(52) U.S. Cl. ........ 707/705; 707/708; 707/713; 707/722; 706/12; 706/14; 706/20

(58) Field of Classification Search .................. None
See application file for complete search history.

(56) References Cited

U.S. PATENT DOCUMENTS

| | | | |
|---|---|---|---|
| 5,265,014 A | 11/1993 | Haddock et al. | |
| 5,911,138 A | 6/1999 | Li | |
| 6,493,702 B1 * | 12/2002 | Adar et al. | ............. 707/706 |
| 6,707,309 B2 | 3/2004 | Sato et al. | |
| 6,957,390 B2 | 10/2005 | Tamir | |
| 7,158,966 B2 | 1/2007 | Brill | |
| 7,483,894 B2 | 1/2009 | Cao | |
| 7,714,927 B2 | 5/2010 | Terashima | |
| 7,730,054 B1 | 6/2010 | Marmaros et al. | |
| 2005/0076003 A1 | 4/2005 | DuBose | |
| 2005/0102202 A1 * | 5/2005 | Linden et al. | ............. 705/27 |
| 2005/0154730 A1 * | 7/2005 | Miller et al. | ............. 707/9 |
| 2006/0064411 A1 | 3/2006 | Gross et al. | |
| 2006/0224587 A1 | 10/2006 | Zamir | |
| 2006/0248059 A1 | 11/2006 | Chi | |
| 2007/0043706 A1 * | 2/2007 | Burke et al. | ............. 707/3 |
| 2007/0180051 A1 * | 8/2007 | Kelly et al. | ............. 709/217 |
| 2007/0192293 A1 * | 8/2007 | Swen | ............. 707/3 |
| 2007/0266002 A1 | 11/2007 | Chowdhury et al. | |
| 2007/0294615 A1 | 12/2007 | Sathe | |
| 2008/0021884 A1 * | 1/2008 | Jones et al. | ............. 707/3 |

(Continued)

FOREIGN PATENT DOCUMENTS

JP    2001-109752 A    4/2001

(Continued)

OTHER PUBLICATIONS

International Search Report and Written Opinion of PCT/US2009/064798, mailed Jun. 10, 2010.

(Continued)

*Primary Examiner* — Mohammad Ali
*Assistant Examiner* — Angelica Ruiz
(74) *Attorney, Agent, or Firm* — Shook, Hardy & Bacon, LLP (57) ABSTRACT

A system, method, and medium are provided for presenting a user-interface to a user during a search session that includes information about the user's search history during that search session. A search session is instantiated, and search queries, search results, user selections of search results, and other information is recorded. Search results pages provided to the user in response to queries include a session tracker module that displays interactive information associated with recent search queries issued by the user during the same session, such that the user can quickly recall previously issued queries and corresponding search results.

19 Claims, 7 Drawing Sheets

U.S. PATENT DOCUMENTS

| | | | |
|---|---|---|---|
| 2008/0027799 A1 | 1/2008 | Hao et al. | |
| 2008/0033922 A1 | 2/2008 | Cisler | |
| 2008/0033970 A1* | 2/2008 | Jones et al. | 707/100 |
| 2008/0065617 A1* | 3/2008 | Burke et al. | 707/5 |
| 2008/0114751 A1 | 5/2008 | Cramer | |
| 2008/0120278 A1* | 5/2008 | Roe et al. | 707/3 |
| 2009/0070299 A1 | 3/2009 | Parikh et al. | |
| 2009/0089311 A1 | 4/2009 | Chi et al. | |
| 2009/0119254 A1 | 5/2009 | Cross et al. | |

FOREIGN PATENT DOCUMENTS

| | | |
|---|---|---|
| KR | 1019950001505 A | 1/1995 |

OTHER PUBLICATIONS

Danny Sullivan, "Google Search History Expands, Becomes Web History," Webpage, Apr. 19, 2007, 13 pp. http://searchengineland.com/070419-181618.php.

(No Author Listed), "Basic Search and Beyond," PAGLO.COM Webpage, Aug. 1, 2008, 16 pp. http://www.paglo.com/help/using/searching#history.

Greg R. Notess, "Tracking Your Search History," Refrerence Librarian, Montana State University, vol. 30, No. 2, Mar./Apr. 2006, 3 pp. http://www.infotoday.com/online/mar06/OnTheNet.shtml.

(No Author Listed), "Google Talks Tracking," HUOMAH.COM Webpage, 2008, 7 pp. http://www.huomah.com/search-engines/search-engine-optimization/google-talks-tracking.html.

Benjamin Piwowarski and Hugo Zaragoza, "Predictive User Click Models Based on Click-Through History," Article, ACM Magazine, Nov. 6, 2007, Lisboa, Portugal, 8 pp. http://delivery.acm.org/10.1145/1330000/1321467/p175-piwowarski.pdf? key1=1321467 &key2=8341757121&coll=&dl=GUIDE&CFID=80442818 &CFTOKEN=23455663.

Juan Carlos Perez, "Google Feature Logs Users' Histories," IDG News Service, Apr. 21, 2005, 3 pp. http://www.pcworld.com/article/120516/google_feature_logs_users_histories.html.

Elbassouni, Shady, "Adaptive Personalization of Web Search," Master's Thesis Paper, Universitas des Saarlandes, F Informatik Maxd-Plank-Institut fur Informatik, AG 5, Jun. 27, 2007, 84 pp.

Morris, Dan, Meredith Ringel Morris, and Gina Venolia,"SearchBar: A Search-Centric Web History for Task Resumption and Information Re-finding," Microsoft Research, Redmond, WA, USA 10 pp.

Non-Final Office Action mailed Feb. 10, 2011 in U.S. Appl. No. 12/333,070.

Teevan, James, Eytan Adar, Rose Jones, and Michael Potts, "History Repeats Itself: Repeat Queries in Yahoo's Logs," Copyright SIGIR '06, Aug. 6-10, 2006, Seattle, WA, USA, 2 pp.

Teevan, James, "Supporting Finding and Re-Finding Through Personalization," Thesis Paper, Massachusetts Institute of Technology, Feb. 2007, 176 pp.

Yang, Beverly and Glen Jeh, "Retroactive Answering of Search Queries," Copyright by International World Wide Web Conference Committee (IW3C2), WWW 2006, May 23-26, 2006, Edinburgh, Scotland, 10 pp.

Notice of Allowance in U.S. Appl. No. 12/333,070 mailed Aug. 15, 2011, 21 pages.

* cited by examiner

PROVIDING RECENT HISTORY WITH SEARCH RESULTS

The application is related by subject matter to U.S. patent application Ser. No. 12/333,070, filed Dec. 11, 2008 and entitled "HISTORY ANSWER FOR RE-FINDING SEARCH RESULTS," which is assigned to the same entity as this application, and incorporated in this application by reference.

BACKGROUND

Search engines and search services are becoming staples of user interaction with the Internet, and as the wealth of information available online increases, so too does people's reliance on effective and efficient search services for a multitude of projects and situations. Recent research indicates that the majority of time spent by computer users interacting with search services is spent in long search sessions that involve many search queries and selections of search results. Moreover, the data suggests that users spend a significant portion of long search sessions trying to re-find content that they have already viewed.

SUMMARY

The invention is defined by the claims below. This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention provide for displaying information related to search queries recently issued by a user. While engaging in a search session, a user may wish to re-find content that the user accessed from a search results page that was provided in response to a search query during the same search session. To facilitate efficient re-finding of this type of information, a session tracker module is provided on each search results page. The session tracker module displays recently issued queries and can include, for example, links to search results that the user previously accessed. Other information such as, for example, the number of times the user accessed a particular search result, the time the user spent viewing the content (referred to herein as "dwell time"), and the number of search results the user clicked, can be displayed in the session tracker module. According to embodiments of the invention, the session tracker module is displayed in an easily locatable position on the search page, but is positioned and sized so that it does not detract from other information presented on the page.

These and other aspects of the invention will become apparent to one of ordinary skill in the art upon a reading of the following description, drawings, and the claims.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As indicated above, embodiments of the present invention provide for conveniently displaying information related to recent search queries issued by a user during a search session. According to a first illustrative aspect of the invention, a computer-readable medium is provided that includes instructions for performing an exemplary method for providing a user-interface during a search session that includes information associated with a user's search activity during the search session. In an embodiment, the exemplary method includes instantiating a search session and receiving a user-defined search query. A representation of the search query is stored in a session log, which is identified using a unique session identifier. In response to receiving the search query, a set of search results is retrieved and the session log is referenced to determine whether the log contains information related to previously issued searches during the same session. The search results are provided to the user on a search results page that also includes a session tracker module. If the session log includes information related to previous queries, a portion of that information can be displayed in the session tracker module and can include hyperlinks for reissuing queries, re-accessing search results, and the like.

According to another illustrative aspect of the present invention, a computer-readable medium is provided that includes instructions for performing another exemplary method for providing a user-interface during a search session that includes information associated with a user's search activity during the search session. Embodiments of the exemplary method include receiving a plurality of user-defined search queries during a search session associated with a user. Sets of search results are provided to the user and each set of search results includes at least one content link targeting relevant content. When the user selects content links, selection indications are received that provide indications of those selections. Representations of the queries, search result sets, and selection indications are recorded and stored as history information. In response to subsequent queries, portions of the recorded history information are provided to the user in a session tracker module on a search results page.

According to a third illustrative aspect of the present invention, a computer-readable medium is provided that includes instructions for performing another exemplary method for providing a user-interface during a search session that includes information associated with a user's search activity during the search session. In embodiments of the exemplary method, an illustrative first step includes receiving a first user-defined search query and recording a time-stamped data representation of the query in a history record, which is stored in a database. A first set of search results is provided in response to receiving the first query and includes selectable representations of relevant content that is maintained at corresponding content sites. The selectable representations are associated with uniform resource locators (URLs) that target the content sites such that the user can navigate to the content sites by selecting the representations. A time-stamped data representation of each URL is recorded. Embodiments of the exemplary method further include receiving selection indication that indicate that the user has selected representations of content and time-stamped data representations of the selection indications are also recorded. Upon receiving a second user-defined query, a search results page is provided to the user that includes a selectable representation of the first query.

Figure 1:
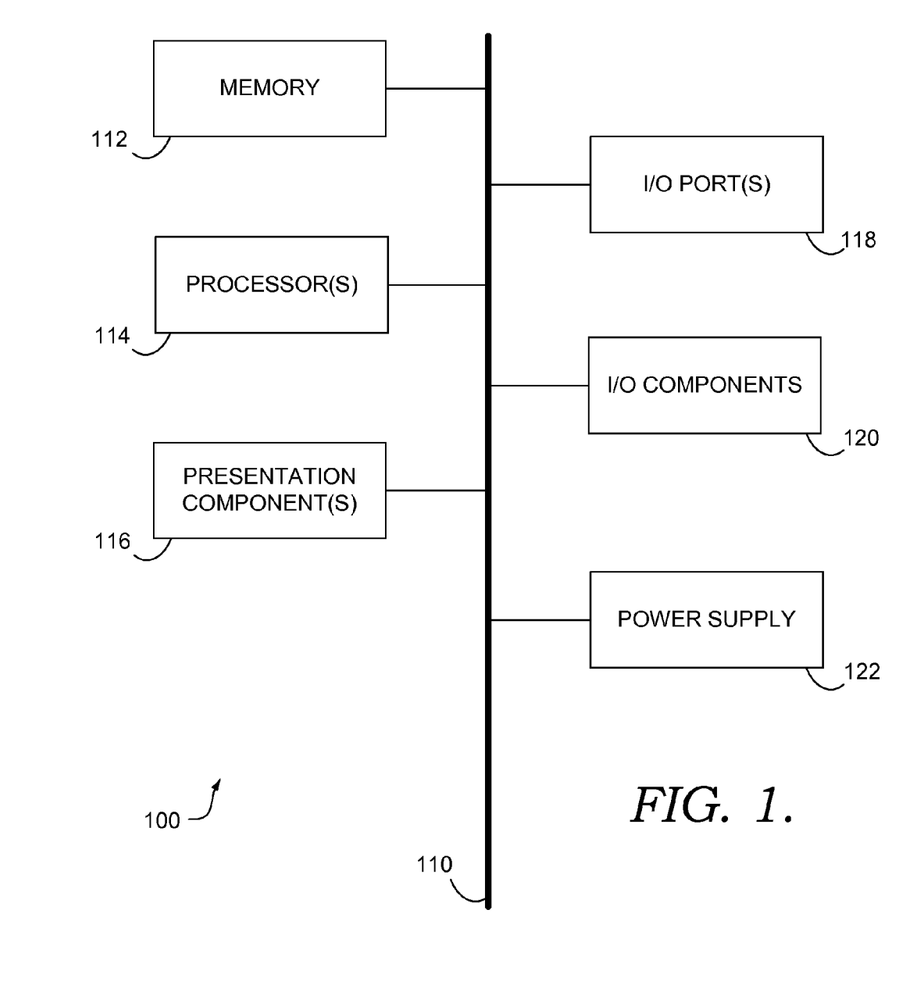
FIG. 1 is a block diagram of an exemplary computing environment suitable for use in implementing embodiments of the present invention.

An exemplary operating environment in which various aspects of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, an exemplary computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "worksta-tion," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer-readable storage media. Computer-readable storage media includes both volatile and nonvolatile, removable and non-removable media implemented in any method or technology for storage of information such as computer-readable instructions, data structures, program modules or other data. Computer-readable storage media includes, but is not limited to, RAM, ROM, EPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, and the like.

I/O ports 118 allow computing device 100 to be logically coupled to other devices including I/O components 120, some of which may be built in. Illustrative components include a microphone, joystick, game pad, satellite dish, scanner, printer, wireless device, keyboard, pen, voice input device, touch input device, touch-screen device, interactive display device, or a mouse.

As previously mentioned, in one embodiment, the present invention relates to providing a user-interface during a search session that includes information associated with a user's search activity during the search session.

Figure 2:
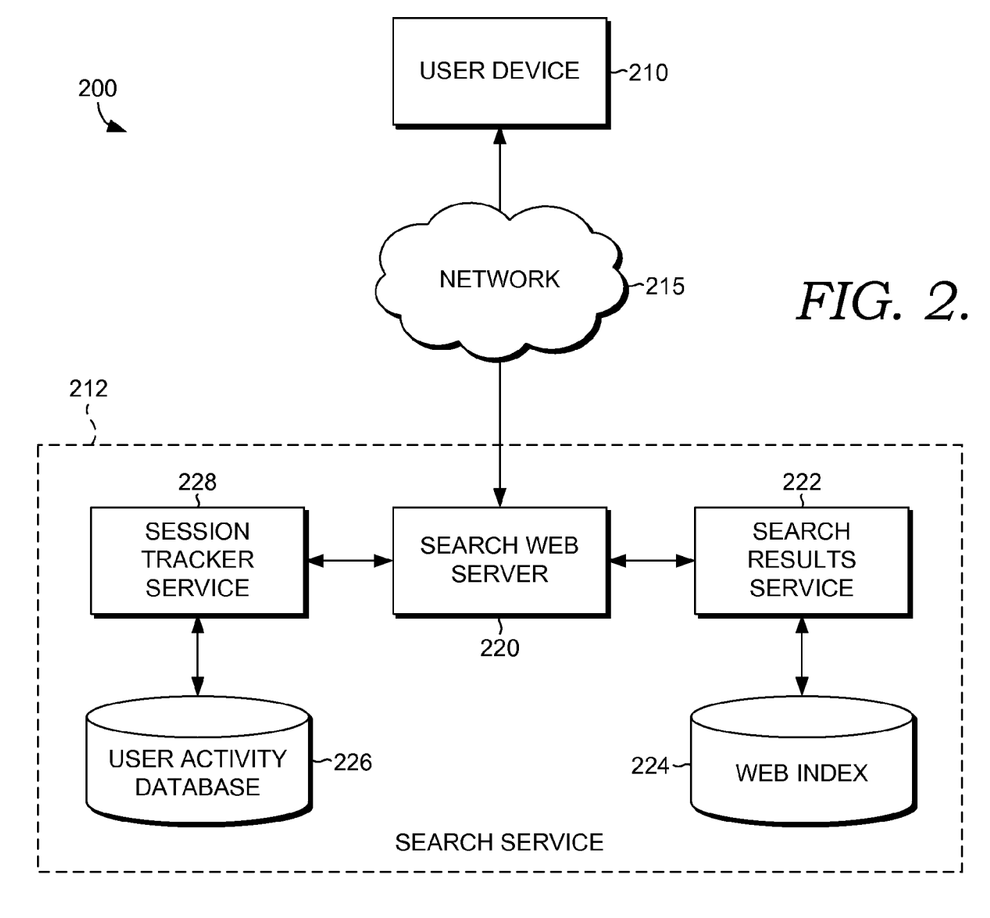
FIG. 2 is a block diagram illustrating an exemplary networking environment according to embodiments of the present invention.

Turning to FIG. 2, a block diagram is shown, illustrating the relevant components of an exemplary networking environment 200 according to an embodiment of the present invention. Exemplary networking environment 200 is an environment that provides search services to a user, wherein the user may submit a query, i.e. perform a search, and retrieve search results in response. Exemplary networking environment 200 includes a user device 210, a search service 212, and a network 215 through which the user device 210 and search service 212 can communicate. As illustrated further in FIG. 2, search service 212 includes a number of different components, some of which are depicted herein. For instance, in the illustrated embodiment, search service 212 includes a search web server 220, a search results service 222, a web index 224, a user activity database 226, and a session tracker service 228.

It should be understood that the networking elements illustrated in FIG. 2 are scalable. That is, there may be any number of user devices, search services and networks associated with a particular networking environment. Moreover, the components of search service 212 are similarly scalable, as a search service 212 can have any number of components such as those illustrated in FIG. 2. Additionally, there may be other elements not shown in FIG. 2 that provide various functionalities, services, interfaces, and the like. The exemplary networking environment 200 is only one of a number of possible configurations, and is illustrated as having a limited number of network elements for simplicity and clarity. The illustrations and descriptions herein are not intended to limit the functionality, configuration, or other aspect of any network suitable for implementing embodiments of the present invention.

Search service 212, as well as any or all of the components 220, 222, 224, 226, and 228 thereof illustrated in FIG. 2 may be implemented as server systems, program modules, virtual machines, components of a server or servers, networks, and the like. In one embodiment, for example, each of the components 220, 222, 224, 226, and 228 is implemented on a separate machine. In another embodiment, all of the components 220, 222, 224, 226, and 228 are implemented on a single server or a bank of servers.

User device 210, illustrated in FIG. 2, is a communication device that a user can utilize to perform a search by submitting a query to the search server 212. User device 210 can be a computing device such as computing device 100 described above with reference to FIG. 1, although the nature of user device 210 is not limited to this description. In various embodiments, user device 210 includes a unique machine identifier (MID) such as a MAC address, an internet protocol (IP) address or the like. In embodiments, the machine identifier is always the same for user device 210, and in other embodiments, the machine identifier is dynamically assigned upon connection to a network, communication with a particular server, or the like. The term machine identifier, as used herein, is intended to encompass any variation of these types of identifiers, and is to be differentiated from a user identifier, which is associated with a user regardless of the machine that the user operates.

As shown in FIG. 2, user device 210 communicates with search web server 220 via network 215. Search web server 220 receives user-defined search queries, i.e., search requests, from user device 210. Search web server 220 may be or include, for example, a search engine, a crawler, or the like. Search web server 220, in some embodiments, is configured to perform a search using a query submitted by user device 210. In other embodiments, search server forwards the user query to another network element such as, for example, search results service 222, which may perform the search. In various embodiments, search web server 220 can provide a user interface for facilitating a search experience for a user communicating with user device 210.

As illustrated in FIG. 2, search web server 220 communicates with search results service 222, and session tracker service 228. In an embodiment, the search web server 220 only communicates with one or two of services 222 and 228, and in other embodiments, search web server 220 communicates with both. In an embodiment of the present invention, when search web server 220 receives a user-defined query from user device 210, search web server 220 forwards that query to search results service 222. Additionally, search web server 220 can forward the query to session tracker service 228, which provides the query to the user activity database 226.

Search web server 220 can also be configured to perform authentication and verification services associated with users who subscribe to particular services or establish accounts associated with search service 212. In other embodiments, these services can be performed by another component of search service 212 such as session tracker service 228 or a component not illustrated in FIG. 2. In an embodiment, a user may be able to establish an account or subscription to services, and thereby be assigned a permanent or dynamic user identifier (UID). A user may have an associated user profile that is identified by the user's UID. In some embodiments, the profile can include, or be associated with, a user's history profile that is maintained in the user activity database 226. A user profile can include information about the user such as, for example, the user's name, demographic information, authentication information (e.g., username, password, security question, etc.), preference information, and the like. As used herein, a user's history profile can include information such as search history information, MIDs used by the user in the past, search results ranking information, preference information, search result page configuration preferences, and the like.

According to embodiments of the present invention, users can utilize search service 212 either as authenticated users or as unauthenticated users. When a user utilizes search service 212 as an unauthenticated user, he or she does so without signing in. As used herein, signing in can refer to any number of processes by which a user declares his or her identity to search service 212 and verifies the accuracy of that declared identity. These processes are well-known in the art (e.g., logging in by providing a username and password) and the details thereof are not germane to the present disclosure. When a user utilizes search service 212 as an unauthenticated user, the user, and information associated with the user, can be identified by a session identifier (SID) or an MID, or both. In some embodiments, the SID can be the MID, and in other embodiments, the SID and the MID are different. In an embodiment, for example, information collected during an unauthenticated user's session is associated with the corresponding SID. In another embodiment, the information can be associated with both an SID and a distinct MID.

When a user utilizes search service 212 as an authenticated user, however, information collected, provided, and otherwise communicated during the session can be associated with the user's UID. In embodiments, the information can be also associated with the SID and/or an MID, although it should be recognized that a user may utilize search service 212 via different user devices 210 at different times, such that the corresponding MID may not always be the same. Moreover, as with unauthenticated users, in some embodiments, the SID can be the same as the MID or the UID, while in other embodiments, the any of the SID, MID, and UID can be different from the others. Throughout the present disclosure, for the purpose of brevity, SID is intended to refer to any identifier that is used to identify information associated with a search session, and can include an MID and/or a UID.

As used herein, history information refers to information that reflects the activity of a user and the search service, and can include data representations of search queries issued by the user, search results provided to the user in response to search queries, selection indications that indicate that the user has selected a search result or other content link, dwell time (indicating the amount of time a user spends at a particular content site or viewing a search results page), and any other type of activity that can be monitored and recorded by tracking a user's inputs. Data representations, as referred to throughout the present disclosure, mean information that can be stored and accessed, and can take the form of any number of different types of formats. In embodiments of the present disclosure, each instance of history information collected and recorded is time-stamped.

With continued reference to FIG. 2, the exemplary networking environment 200 includes search results service 222. Search results service 222 can include a search engine, crawling component, querying component, or the like. In an embodiment, search results service 222 is configured to receive a submitted query and to use the query to perform a search, such as by traversing a web index 224 to identify content satisfying the terms of the user-defined search query. In an embodiment, upon identifying search results that satisfy the search query, search results service 222 returns a set of search results to user device 210 by way of a graphical interface generated by search web server 220. A set of search results includes representations of content or content sites (e.g., web-pages, databases, or the like that contain content) that are deemed to be relevant to the user-defined search query. Search results can be presented, for example, as content links, snippets, thumbnails, summaries, and the like. Content links refer to selectable representations of content or content sites that correspond to an address for the associated content. For example, a content link can be a selectable representation corresponding to a uniform resource locator (URL), IP address, or other type of address. That way, selection of a content link can result in redirection of the user's browser to the corresponding address, whereby the user can access the associated content. One commonly used example of a content link is a hyperlink.

According to embodiments of the present invention, a data representation of each search query and the set of search results provided in response thereto is recorded in the user activity database 226. Additionally, when a user selects a content link, a selection indication can be generated that informs search service 212 that the user has selected the content link. In embodiments, a representation of the selection indication is also recorded and time-stamped such that the search results viewed by the user can be tracked, as well as the time spent viewing the associated content.

Search results can include representations of content of any kind such as, for example, a list of documents, files, or other instances of content that satisfy the search terms of the query. In an embodiment, search results include the actual content that satisfies the search query. In other embodiments, search results include links to content, suggestions for related queries, and the like. In an embodiment, search results service 222 communicates a message to user device 210 if the submitted query does not yield any results. The message informs user device 210 that the submitted query did not yield any results. In another embodiment, search results service 222 communicates information about the failure to obtain results to search web server 220, which sends a notification to user device 210 indicating the same.

As further illustrated in FIG. 2, exemplary networking environment 200 includes session tracker service 228. Session tracker service 228 facilitates the collection of search history information associated with a user, as well as the display of recent history information via a session tracker module on the search results page. When a user begins searching for content using search service 212, a search session is instantiated. In embodiments, the search session is instantiated by session tracker service 228, and in other embodiments, the search session can be instantiated by search web server 220. As used herein, a search session refers to a variable length of time during which a user is utilizing search service 212 to search for content. In an embodiment, each session is identified by an SID. In an embodiment, session tracker service 228 associates an SID with an instantiated search session, and in other embodiments, the SID can be associated with the session by another component such as, for example, search web server 220. Throughout the course of a session, the associated SID is used for various purposes, including, for example, to keep track of history information collected during the session. That is to say that, when history information is collected and recorded, it is associated with the SID corresponding to the search session to which the history information pertains.

As mentioned above, a search session refers to a variable length of time. The length of time of a search session is configurable, and can be either predetermined, dynamically determined, or determined according to occurrence of particular events. For example, in an embodiment, a search session can be defined by a predetermined amount of time, for example an hour. In this case, the predetermined amount of time can be thought of as a cap, or an upper bound, on the amount of time during which a particular SID will be associated with a user's search history. Thus, if a user actively searches for content using search service 212 for twenty minutes and then navigates away from search service 212, the search session can terminated, as it does not make sense to allow a session to continue to run in the absence of user activity. It should be understood that various types of thresholds and rules can be established for determining when a search session should be terminated, so as to allow for instances where a user may temporarily engage in an unrelated task, and return to the search session.

In other embodiments, the time period constituting a search session can be dynamically determined. For example, search service 212 may present an option to the user that allows the user to manually configure the time for each search session. In further embodiments, the time period corresponding to a search session may be determined based on the level of user activity, the nature of user activity, or the like. In some cases, search session time periods can be configured based on bandwidth requirements, business rules, or other various types of considerations. In still further embodiments of the present disclosure, the length of a search session can be determined by the occurrence of certain events. For example, a search session can be instantiated upon the occurrence of an event such as the user first navigating to search service 212, the user changing states from unauthenticated to authenticated by signing in, and the like.

According to embodiments of the present disclosure, session tracker service 228 performs the operations necessary to provide users with history information associated with the users' current search session. That is, during the course of a search session, as history information is recorded, session tracker service 228 retrieves portions of the history information from user activity database 226 and provides the information to search web server 220 such that the information can be displayed to the user, for example, on a search results page. In embodiments, session tracker service 228 references a session log, which is a collection of recorded history information associated with a particular SID, and determines whether the session log includes history information that should be displayed to the user. For example, in some embodiments, the session tracker service 228 retrieves representations of recent searches issued by the user, sets of search results provided in response thereto, and selection indications. Session tracker service 228 can be configured to retrieve a predetermined number of searches and related history information automatically or in response to a user or administrator's preference.

Figure 3:
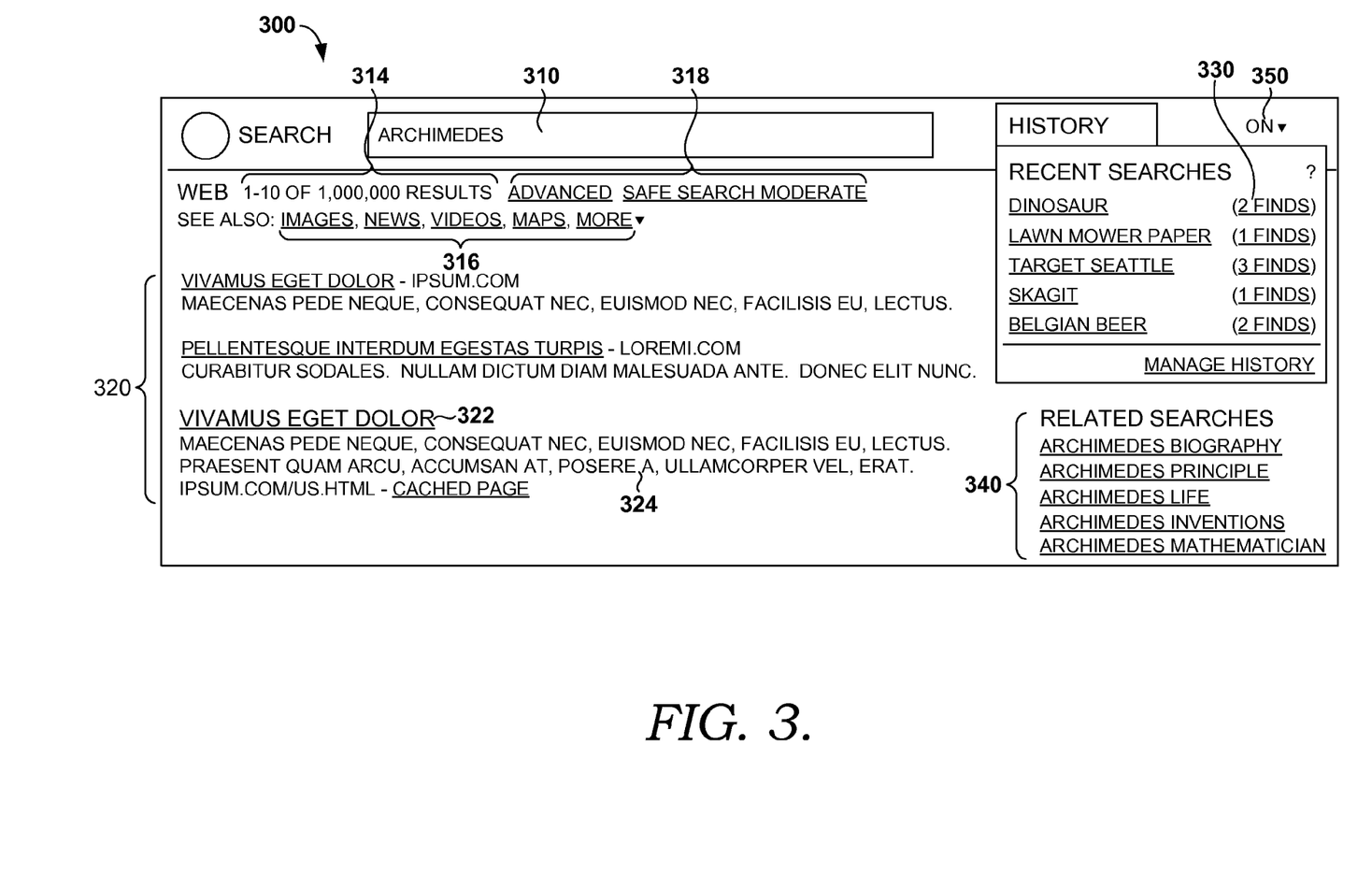
FIG. 3 depicts an illustrative search results page that includes a session tracker module according to embodiments of the present invention.

Turning now to FIG. 3, an exemplary search results page 300 is depicted in accordance with an embodiment of the present invention. Search results page 300 includes an input field 310 for allowing a user to submit a search query by typing in search terms. Search results page 300 also includes a selectable button 312 for initiating a search, a search result summary 314, content type options 316, search type options 318, and a set of search results 320. Search results page 300 also includes a session tracker module 330 and a related searches module 340.

As illustrated, the set of search results 320 includes a number of representations of relevant content. Each representation of content includes a title 322 and a caption 324. In embodiments, a representation can include a content link that corresponds to a URL or other address such that selection of the content link causes redirection of the user's browser to the associated content site. For example, in FIG. 3, the title 322 of each representation of content is also a content link such as a hyperlink. The title 322 can include the name of the content site, the name of a company that sponsors the content site, a phrase that represents the content, or the like. Similarly, the caption 324 can include snippets from the relevant content, a summary of the content, or the like. According to various embodiments of the present invention, any number of search results can be displayed in the set of search results 320. Additionally, the search results can be ranked according to various metrics and ranking schemes and can be displayed according to rank.

The session tracker module 330 is illustrated as being displayed near the top-right corner of the search results page 300. In other embodiments, the session tracker module 330 can be displayed in any number of other locations on the search results page 300 such as, for example, in a lower corner, near the center, along the top, or along the bottom of the page 300. In embodiments of the present disclosure, the session tracker module 330 is always displayed on the search results page 300 and in other embodiments, it is displayed only when there is history information available to display. Thus, when a search session is first instantiated, there has not been any search queries or related information recorded, and accordingly, the session tracker module 330 may not be displayed at all. In some embodiments, upon instantiation of a search session, a blank session tracker module 330 is displayed.

Additionally, as illustrated in FIG. 3, some embodiments include an on/off toggle 350 that allows the user to enable and disable the session tracker module 330. When the session tracker module 330 is disabled (i.e., when the toggle 350 is set to "off"), the user's search history is not recorded or displayed. In some embodiments, the user may be able to disable display of history information, while enabling continued collection of the information. In other embodiments, the user may be able to configure the collection and display of history information by adjusting or setting preferences associated with the session tracker module 330.

Figure 4:
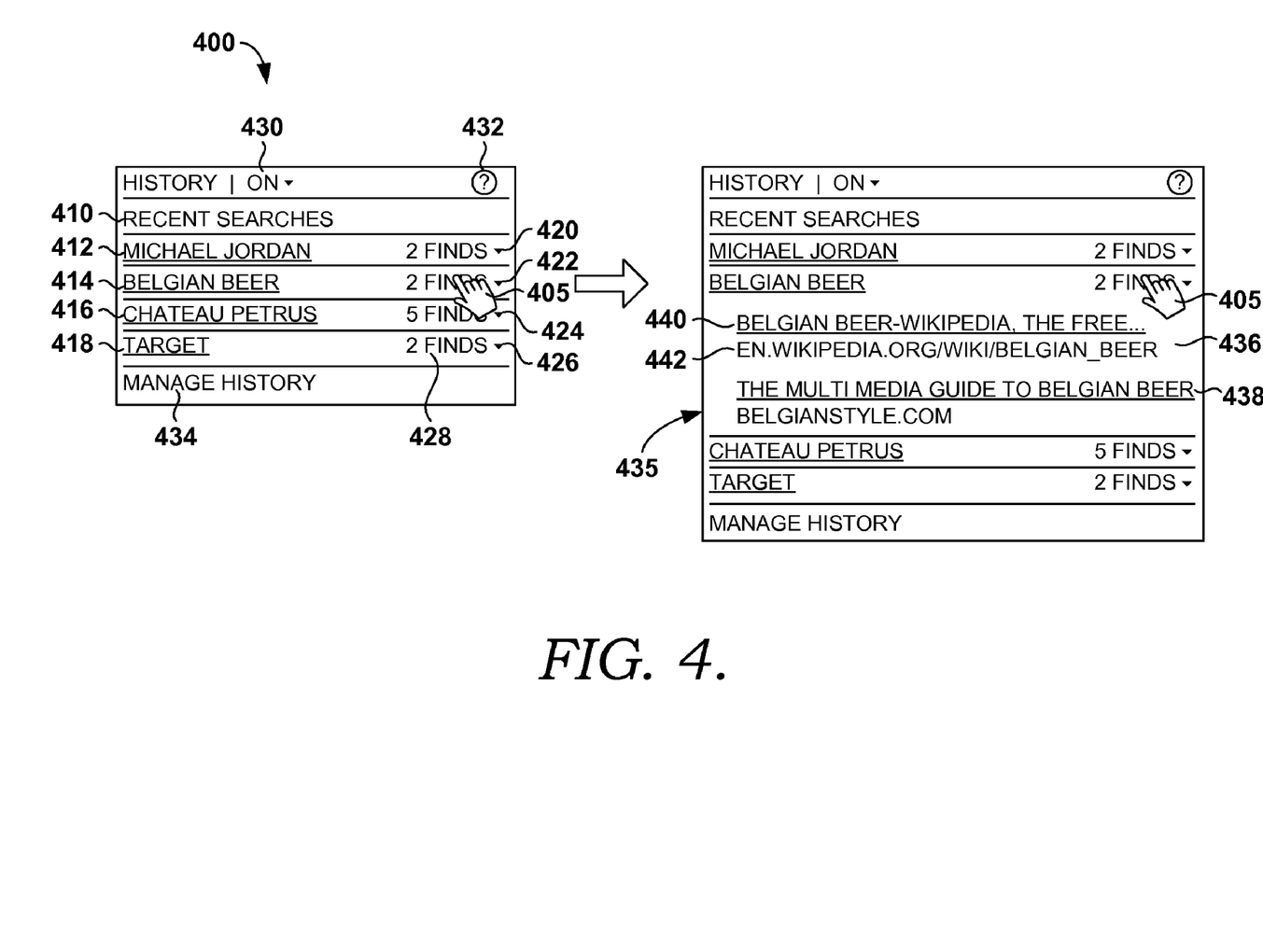
FIG. 4 depicts two views of an illustrative session tracker module according to embodiments of the present invention.

Turning to FIG. 4, two views of an illustrative session tracker module 400 is depicted in accordance with embodiments of the present disclosure. The session tracker module 400 includes a descriptive title 410 that informs the user of the type of information displayed in the module 400—in this case, recent searches. The session tracker module 400 further includes a number of selectable representations of recently issued search queries 412, 414, 416, and 418. In embodiments, selection of one of the selectable representations of search queries 412, 414, 416, or 418 results in the selected query being re-issued. In other embodiments, selection of one of the selectable representations of search queries 412, 414, 416, or 418 results in automatic navigation of the user's browser to the search results page that includes the set of search results provided in response to the selected query. In further embodiments, selection of one of the selectable representations of search queries 412, 414, 416, or 418 results in display of additional information regarding the query and/or the set of search results that had been provided to the user in response to the original issuance of the selected query.

The session tracker module 400 also includes a selectable toggle 430 that allows the user to selectively enable or disable the session tracker service. If the toggle 430 is set to "ON," history information associated with the user's search session is recorded and can be presented in the session tracker module 400. If the toggle 430 is set to "OFF," history information is not recorded, and the session tracker module 400 will be blank. In some embodiments, setting the toggle 430 to "OFF," can cause removal of the session tracker module 400 from subsequent search results pages, although in those embodiments, there should be some option easily located by the user for toggling the state of the session tracker service. The session tracker module 400 further includes a selectable option 432 for displaying an informational interface such as a help menu, an informational index, or the like.

As further illustrated in FIG. 4, the session tracker module 400 includes selectable numbers 420, 422, 424, and 426 representing the number of selection indications received with respect to each of the previous queries 412, 414, 416, and 418, respectively. For example, as illustrated in FIG. 4, one previous search query 414 issued by the user consisted of the search terms "BELGIAN" and "BEER." The corresponding selectable number 422 indicates that, of the search results provided to the user in response to that search query 414, the user clicked on (i.e., selected) two different content links. As illustrated, in some embodiments, a word or phrase can accompany the number to clarify the meaning of the number such as, for example, the word "finds." That way, the user understands that, in response to the search query 414 "BELGIAN BEER," the user selected two content links, or in other words, the user expressed interest in two finds.

As indicated above, the number 422 is selectable. Thus, if a user selects (e.g., clicks on) "2 FINDS," such as by positioning a mouse cursor 405 over the selectable number 422 and depressing a mouse button, the field associated with the corresponding query 414 is expanded, as illustrated in FIG. 4. The expanded field 435 can include various types of information. In the embodiment depicted in FIG. 4, the expanded field 435 includes additional information about the search results that the user previously selected. This information is presented as selectable representations 436 and 438 of the selection indications received in response to the user's previous selections of content links. Additionally, the user can collapse the expanded field 435 by positioning the cursor 405 over the selectable number 422 and depressing a mouse button. It should be understood that other methods of selecting the representations and links discussed throughout this disclosure are considered to be within the ambit of the present invention such as, for example, contacting a touch-screen, depressing a hotkey, and the like. According to some embodiments, a user can expand any number of the fields corresponding to search queries 412, 414, 416, and 418 and the corresponding expanded fields can be maintained simultaneously. In an embodiment, subsequent selection of one of the selectable numbers 420, 422, 424, or 426 causes the field corresponding to the selection to be collapsed, whereas in other embodiments, selection of one of the numbers 420, 422, 424, or 426 causes all of the fields to collapse.

The representations 436 and 438 can be presented in a number of different ways. For example, in the illustrated embodiment, the representation 436 includes a title 440 and the URL 442 that targets the corresponding content link. In embodiments, the title 440 can be the same title that was originally presented on the search results page provided in response to the previous query 414. In other embodiments, the title 440 can be a truncated version of the original title, or even a different title altogether, so long as it sufficiently identifies the content or content site that corresponds thereto. Additionally, in some embodiments, the URL 442 is not displayed, and in further embodiments, other information such as a summary, snippet, thumbnail, or the like, can be displayed as part of the representation 436 of the selection indication. For example, a user may wish to configure the session tracker module such that the representation 436 includes a snippet from the content site, an indication of the user's dwell time at the content site, a rating of the content site, or other such information.

The representations 436 and 438 may, themselves, also include content links. For instance, in an embodiment, the title 440 of the representation 436 can be presented as a selectable text string such as, for example, a hyperlink. In another embodiment, the URL 442 is provided as a content link. In other embodiments, an icon, thumbnail, graphic, button, or other displayed object or text can be provided that includes a content link. Upon selecting the content link, the user's browser is redirected to the content site that corresponds to the representation 436, 438 of the selection indication. In this manner, a user can quickly recall content that the user previously viewed with relation to the recent query 414. Additionally, in embodiments, the representation 414 of the recent search query can also be provided as a link. In some embodiments, the representation 414 of the search query includes a link to the search results page that was originally provided to the user in response to that query. In other embodiments, the representation 414 of the search query includes a link that causes the search query to be reissued.

Although in many cases, these two exemplary types of links would cause the same search results page to be provided, it should be understood that reissuing the query can actually have a different result than simply recalling, from a historical database or cache, the previously provided search results page. For instance, events or user history that occurs between the time that the user viewed the original search results page and the time when the user causes the query 414 to be reissued can result in changes to the presentation of the search results page. For example, the search results returned in response to the reissued query 414 can be ordered differently as a result of an updated ranking scheme, different advertisements can be provided on the search results page as a result of heuristics or other rules based on events or user history, and the like. Therefore, in some embodiments, a user may be able to choose the action to be performed upon selection of the representation 414. Similarly, in embodiments, options can be provided to the user for configuring any of the selectable representations to include a desired action upon selection thereof. In this way, the user can configure the session tracker module such that the user's experience is personalized and provides the type of search recall experience that the user desires.

As further illustrated in FIG. 4, the session tracker module 400 includes a selectable option 434 for requesting a management module. The management module, which is not shown in FIG. 4, can include any number of different types of user-interfaces adapted to allow a user to configure the session tracker module 400 and the associated search session experience. For instance, by selecting the option 434, the user can be provided with options for determining how and when history information will be recorded, presented, and the like. Options can be provided for configuring the size, shape, appearance, and functionality of the session tracker module 400. In some embodiments, options can be provided for removing history information from the online database, for adding information to the database, for setting preferences, and the like. In embodiments, the user may be able to configure the type of information displayed on the search results page or in the session tracker module. For example, in one embodiment, the user can optionally configure the rules by which previous queries are selected to be presented in the session tracker module. A user may configure the session tracker module to display the most recent queries, the queries issued most frequently by the user, the queries that returned the most popular search results (as determined by frequency of selection by the user and/or others), the queries that are most relevant to a current query, and the like. According to embodiments of the present invention, any number of the features and functionalities discussed herein can be configurable by the user via some form of a management module.

Figure 5:
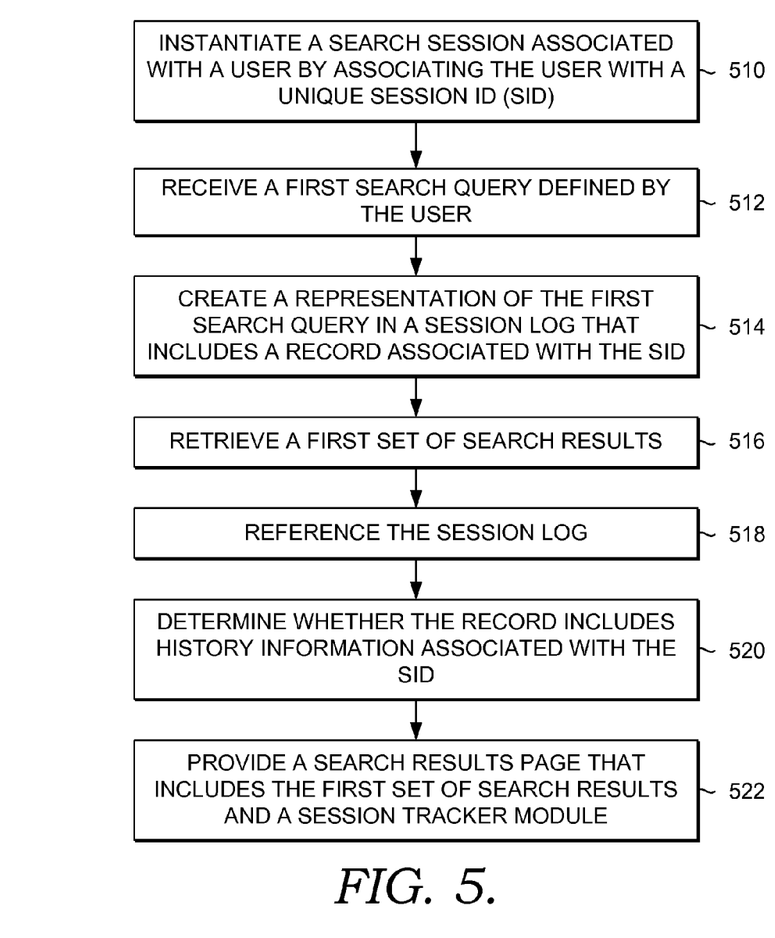
FIGS. 5-7 are flow diagrams illustrating exemplary methods for providing information about recent search queries issued by a user during a search session according to embodiments of the present invention.

Turning now to FIG. 5, a flow diagram is provided that illustrates an exemplary method for providing a user-interface during a search session that includes information associated with the user's search activity during the session. The exemplary method includes, as an illustrative first step 510, instantiating a search session associated with the user by associating the user with a unique session identifier (SID). In an embodiment, the user may access the search service as an unauthenticated user. In this case, the SID can be associated with a machine identifier such as a MAC address that corresponds to the computing device that the user utilizes to communicate with the search service. In another embodiment, the user can be authenticated through a login process, where the SID is associated with a user identifier (UID) that is unique to that particular user. In further embodiments, a search session can be instantiated by establishing a beginning time for the search session. Similarly, the search session can be subsequently terminated by establishing an ending time.

At step 512, a first search query defined by the user is received. The first search query can contain any number of search terms and, according to various embodiments, can be a natural language query, a Boolean query, or the like. At step 514, a representation of the search query is created in a session log. In an embodiment, the session log includes a record or records associated with the SID, and can be used to record various types of user search history. The session log can be stored in a database. In an embodiment, if the user is an unauthenticated user, the session log is maintained for the duration of the search session and, if the user is authenticated, the session log can be maintained for a longer period of time such that the information recorded therein can be used or presented during subsequent search sessions associated with the user.

At step 516, a first set of search results is retrieved in response to the first search query. As illustrated at step 518, the session log is referenced. In embodiments of the present disclosure, a session tracker service can query the database to reference information contained in the session log. A determination is made whether the record includes history information associated with the SID, as shown at step 520. History information can include data representations of user activity during the search session. For example, in an embodiment, history information can include a first representation of a previously issued search query and representations of search results provided in response to that search query. The history information may also include selection indications that provide information regarding a user's selection of various search results that were provided in response to the previously issued query. If such history information does exist within the session log, various types of analysis can be performed such as, for example, application of heuristics, statistical rules, ranking procedures, and the like, to determine which, if any, portions of that history information should be provided to the user.

At a final illustrative step 522, a search results page is provided to the user. The search results page includes the first set of search results and a session tracker module. As described previously, the session tracker module can be adapted to present history information corresponding to the current search session. For instance, if the session log includes history information associated with the SID, the session tracker module can display a second representation of the previously issued search query, as well as a selectable option for displaying a second representation of the search results issued in response to that query or any of the selection indications received in response to the user's selection of various ones of those search results. According to an embodiment, if the session log does not include history information, a blank session tracker module can be displayed. In another embodiment, if the session log does not include history information, a search results page is provided that does not include a session tracker module.

Figure 6:
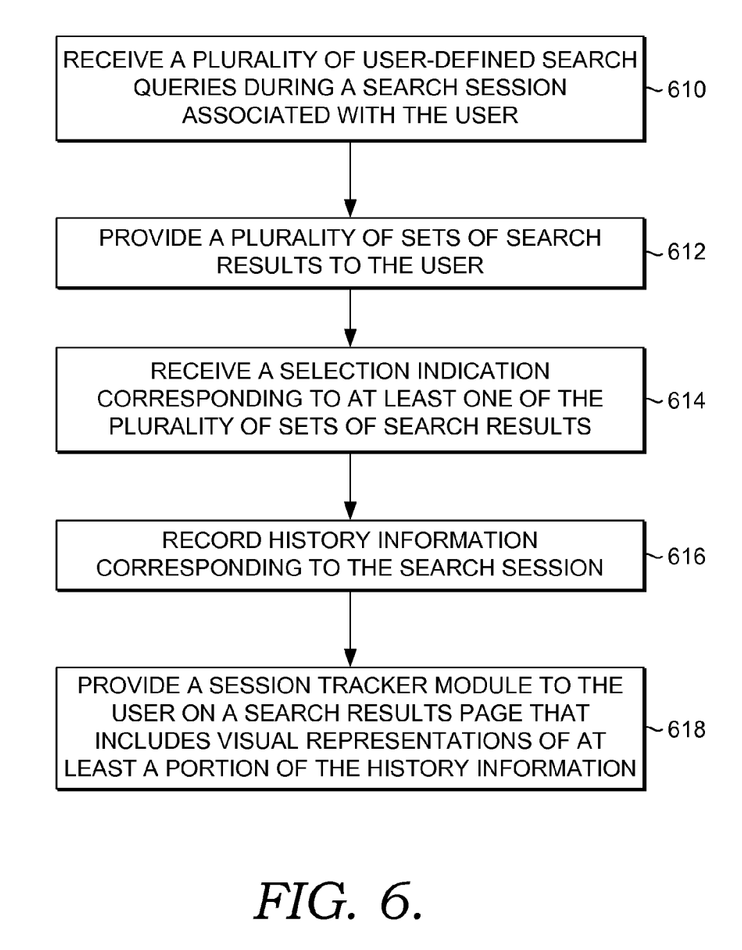

Turning now to FIG. 6, another flow diagram is provided that illustrates a second exemplary method for providing a user-interface during a user's search session that includes information associated with the user's search activity during the session. At a first illustrative step 610, the exemplary method includes receiving a plurality of user-defined search queries during a search session associated with the user. As shown at step 612, a plurality of sets of search results are provided to the user. Each set of search results can include any number of content links that are provided in response to the corresponding search query. The content links are selectable such that selection of a content link causes the user's browser to be redirected to a content site that includes the relevant content. In response to the user selecting a content link associated with one of the sets of search results, a selection indication is received, as shown at step 614.

At step 616, history information corresponding to the search session is recorded. The history information can include information such as time-stamped representations of each of the queries, each of the sets of search results (including each of the content links contained therein), and any selection indications that are received. Additionally, in embodiments, the history information can include other data that indicates user dwell time at certain content sites, frequency of selection of content sites, selection indications related to advertisements that are presented on various search results pages, and the like.

At a final illustrative step 618, a session tracker module is provided on a search results page. The session tracker module includes visual representations of at least a portion of the history information that was recorded in step 616. In an embodiment, the session tracker module displays a predetermined number of visual representations of the search queries received during the session. For example, the session tracker module might display five, ten, or many more of such representations. In another embodiment, heuristics or other rules can be applied to the history information to configure the information that is displayed. For example, the session tracker module can display representations of only the most recent queries in reverse chronological order. In other embodiments, the session tracker module displays representations of queries that are similar or otherwise relevant to the query in response to which the search results page is being provided. In other embodiments, the session tracker module displays representations of the most frequently received queries and in further embodiments, representations of the queries that resulted in the most user interaction with the corresponding search results are displayed.

As illustrated above with respect to FIG. 4, the session tracker module displayed at step 618 of FIG. 6 also can display a selectable number corresponding to each displayed representation of a search query. The selectable number can indicate the number of selection indications that were received in response to user selection of content links provided as search results in response to that query. In an embodiment, the selectable number can include a toggle that can cause display of visual representations of the selection indications received that correspond to the set of search results provided in response to the corresponding query. The visual representations of selection indications can include content links to the relevant content sites, titles indicating the subject matter or nature of the associated content, URLs associated with the relevant content, summaries of the content, snippets from the content, and the like.

Figure 7:
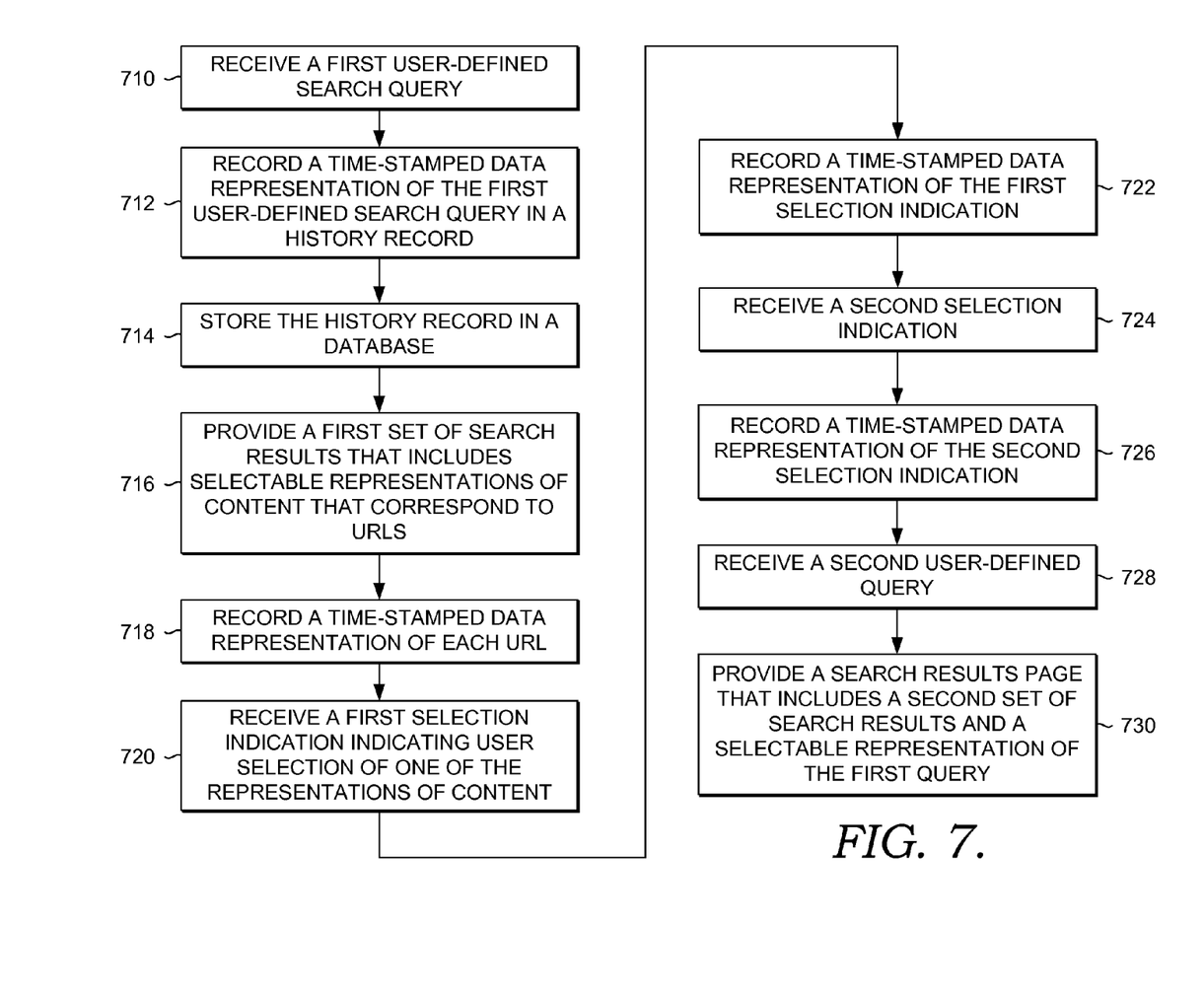

Turning to FIG. 7, a final flow diagram is provided that illustrates another exemplary method for providing a user-interface during a user's search session that includes information associated with the user's activity during the search session. At a first illustrative step 710, a first user-defined search query is received. A time-stamped data representation of the first user-defined search query is recorded in a history record, as shown at step 712. At step 714, the history record is stored in a database.

As shown at step 716, a first set of search results is provided in response to receiving the first user-defined search query. The first set of search results includes selectable representations of content. Each representation corresponds to a relevant content site that is relevant to the first user-defined search query. As shown, selection of one of the representations results in automatic navigation according to an associated uniform resource locator (URL) that targets the relevant content site. A time-stamped data representation of each URL is recorded, as illustrated at step 718.

At step 720, a first selection indication is received. The first selection indication indicates that the user has selected a first one of the representations of content. A time-stamped data representation of the first selection indication is recorded, as shown at step 722. Subsequently, at step 724, a second selection indication is received. As with the first selection indication that was received, a time-stamped data representation of the second selection indication is recorded at step 726.

As illustrated at step 728, a second user-defined search query is then received. In response to receiving the second search query, a search results page is provided to the user, as shown at a final illustrative step 730. The search results page includes a second set of search results and a selectable representation of the first user-defined search query. In embodiments, the search results page also includes a selectable number indicating receipt of the first and second selection indications such that selection of the number results in display of a selectable representation of each of the first and second relevant content sites. In embodiments, each of the first and second representations of the first and second relevant content sites corresponds to an associated URL such that selection of one of these representations results in automatic navigation to the associated relevant content site.

The present invention has been described in relation to particular embodiments, which are intended in all respects to be illustrative rather than restrictive. Alternative embodiments will become apparent to those of ordinary skill in the art to which the present invention pertains without departing from its scope and may include, for example, providing varying types of services depending on user preferences or subscription status. Other embodiments can include various forms of privacy measures including encryption of history information, multiple levels of passwords, and the like.

In further embodiments, the session tracker module can be configured to rank the previous queries displayed therein according to any number of heuristics, rules, preferences, and the like. In some embodiments, the user can configure any number of display characteristics associated with the session tracker module. It will be further understood that certain features and subcombinations are of utility and may be employed without reference to other features and subcombinations. This is contemplated by and is within the scope of the claims.

What is claimed is:

1. One or more computer-readable storage media having machine-useable instructions embodied thereon for performing a method for providing a user-interface during a user's search session that includes information associated with the user's search history during the session, the method comprising:
   instantiating a search session associated with the user, wherein instantiating the search session comprises associating the user with a unique identifier;
   receiving a first search query defined by the user, wherein the first search query comprises at least one first search term;
   creating a representation of the first search query in a session log, the session log comprising a record associated with the unique identifier;
   retrieving a first set of search results in response to receiving the first search query;
   referencing the session log;
   determining whether the record includes history information associated with the unique identifier, wherein history information comprises at least one first representation of a second search query defined by the user and at least one first representation of a second search result previously returned in response to the second search query, wherein the second search result was selected by the user; and
   simultaneously providing a search results page comprising the first set of search results and a session tracker module, wherein if the record includes history information associated with the unique identifier, providing the search results page comprises displaying in the session tracker module the first representation of the second search query defined by the user and a selectable option for displaying the first representation of the second search result.

2. The media of claim 1, wherein if the record does not include history information, displaying the search results page comprises displaying the first set of search results and a blank session tracker module.

3. The media of claim 1, wherein instantiating a search session associated with the user comprises establishing a beginning time for the search session, wherein the search session is defined by a period of time between the beginning time and an ending time.

4. The media of claim 3, wherein the user is an unauthenticated user communicating via a computing device.

5. The media of claim 4, wherein the unique identifier is associated with a machine identifier corresponding to the computing device.

6. The media of claim 4, wherein instantiating a search session associated with the user comprises authenticating the user through a login process.

7. The media of claim 6, wherein the login process comprises associating the unique identifier with a personal identifier corresponding to the user.

8. One or more computer-readable storage media having machine-useable instructions embodied thereon for performing a method for providing a user-interface during a user's search session that includes information associated with the user's search history during the session, the method comprising:
   receiving a plurality of user-defined search queries during a search session associated with the user;
   providing a plurality of sets of search results to the user, wherein each set of search results comprises at least one content link provided in response to one of the plurality of user-defined search queries;
   receiving a selection indication from the user corresponding to at least one of the plurality of sets of search results, wherein each selection indication comprises information indicating that the user selected the at least one content link associated with the at least one set of search results;
   recording history information corresponding to the search session associated with the user, wherein history information comprises time-stamped data representations of each of the plurality of queries, the plurality of sets of search results, and the selection indication;
   providing a session tracker module to the user on a search results page, wherein providing the session tracker module comprises displaying visual representations of at least a portion of the history information associated with the user, and further wherein the session tracker module is displayed in a same viewable area as at least one of the plurality of sets of search results on the search results page; and
   displaying a plurality of numbers in the session tracker module, each number corresponding to one of the visual representations, wherein each number indicates the number of selection indications received that correspond to the set of search results provided in response to the corresponding query.

9. The media of claim 8, wherein displaying visual representations of at least a portion of the history information comprises displaying a predetermined number of visual representations of the plurality of queries.

10. The media of claim 9, wherein the predetermined number of visual representations of the plurality of queries corresponds to the most recent queries received.

11. The media of claim 10, further comprising displaying the predetermined number of visual representations of the most recent of the plurality of queries in reverse chronological order.

12. The media of claim 9, further comprising displaying a selectable option associated with each of the plurality of numbers, wherein the selectable option comprises a toggle adapted to cause display of visual representations of the selection indications received that correspond to the set of search results provided in response to the corresponding query.

13. The media of claim 12, wherein the visual representations of the selection indications each comprise a content link to the associated content.

14. One or more computer-readable storage media having machine-useable instructions embodied thereon for performing a method for providing a user-interface during a user's search session that includes information associated with the user's search history during the session, the method comprising:

receiving a first user-defined search query comprising at least one first search term;

recording a time-stamped data representation of the first user-defined search query in a first history record;

storing the history record in a database;

providing a first set of search results in response to receiving the first user-defined search query, wherein the first set of search results comprises a plurality of selectable representations of content, each representation corresponding to a relevant content site that is relevant to the first user-defined search query, wherein selection of one of the representations results in automatic navigation according to an associated uniform resource locator (URL), the URL targeting the relevant content site;

recording a time-stamped data representation of each URL;

receiving a first selection indication indicating that the user has selected a first one of the plurality of selectable representations corresponding to a first relevant content site;

recording a time-stamped data representation of the first selection indication;

receiving a second user-defined query comprising at least one second search term;

providing a search results page comprising a second set of search results displayed in response to receiving the second user-defined query, wherein the search results page further comprises a selectable representation of the first user-defined search query; and providing a selectable number indicating receipt of the first selection indication, wherein selection of the selectable number results in display of a selectable representation of the first relevant content site.

15. The media of claim 14, further comprising associating a session identifier with the user in response to receiving the first user-defined search query.

16. The media of claim 14, further comprising:

receiving a second selection indication indicating that the user has selected a second one of the plurality of selectable representations corresponding to a second relevant content site; and recording a time-stamped data representation of the second selection indication.

17. The media of claim 16, wherein the search results page further comprises a selectable number indicating receipt of the second selection indication, wherein selection of the selectable number results in display of a selectable representation of the second relevant content site.

18. The media of claim 17, wherein each of the first and second representations of the first and second relevant content sites corresponds to the associated URL such that selection of one of the selectable representations of the first and second relevant content sites results in automatic navigation to the associated relevant content site.

19. The media of claim 14, wherein the search results page further comprises a selectable toggle option for selectively allowing recording of the time-stamped representations.

* * * * *